US011775084B2

(12) United States Patent
Dekel et al.

(10) Patent No.: US 11,775,084 B2
(45) Date of Patent: Oct. 3, 2023

(54) STYLUS HAPTIC COMPONENT ARMING AND POWER CONSUMPTION

(71) Applicant: Microsoft Technology Licensing, LLC, Redmond, WA (US)

(72) Inventors: Shoham Dekel, Tel Aviv (IL); Assaf Bar-Ness, Ness Zionna (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 17/235,110

(22) Filed: Apr. 20, 2021

(65) Prior Publication Data

US 2022/0334658 A1 Oct. 20, 2022

(51) Int. Cl.
*G06F 3/0354* (2013.01)
*G06F 3/01* (2006.01)
*G06F 3/038* (2013.01)

(52) U.S. Cl.
CPC .......... *G06F 3/03545* (2013.01); *G06F 3/016* (2013.01); *G06F 3/038* (2013.01)

(58) Field of Classification Search
CPC ...... G06F 3/033; G06F 3/0334; G06F 3/0338; G06F 3/046; G06F 3/03545; G06F 2003/04105
See application file for complete search history.

(56) References Cited

U.S. PATENT DOCUMENTS

| | | | |
|---|---|---|---|
| 7,890,863 B2 | 2/2011 | Grant et al. | |
| 8,269,727 B2 * | 9/2012 | Westerman | G06F 3/0488 345/173 |
| 9,239,622 B2 * | 1/2016 | Park | G06F 3/0386 |
| 9,348,416 B2 * | 5/2016 | Weddle | G06F 3/04847 |
| 9,763,628 B2 | 9/2017 | Levesque et al. | |
| 10,114,484 B2 * | 10/2018 | Holsen | G06F 1/3259 |
| 10,186,138 B2 * | 1/2019 | Moussette | G06F 1/163 |
| 10,475,300 B2 | 11/2019 | Hill | |
| 10,671,186 B2 * | 6/2020 | Ribeiro | G06F 3/016 |
| 10,817,063 B2 | 10/2020 | Strandberg | |
| 10,871,835 B2 * | 12/2020 | Holsen | G06F 3/03545 |

(Continued)

OTHER PUBLICATIONS

Hou, et al., "Real-time Adaptive Prediction Method for Smooth Haptic Rendering", In Journal of Computing Research Repository, Mar. 22, 2016, 11 Pages.

(Continued)

*Primary Examiner* — William Lu
(74) *Attorney, Agent, or Firm* — Alleman Hall Creasman & Tuttle LLP

(57) ABSTRACT

Examples are disclosed relating to arming and managing power consumption of a haptic feedback component in a stylus prior to actuating the haptic feedback component to produce haptic output. In one example, at least on condition of detecting a first user interaction with the stylus, power is transmitted for at least a first time period to a haptic circuit communicatively coupled to the haptic feedback component. At least on condition of determining that the first time period expires, it is determined if a second user interaction with the stylus is detected. If the second user interaction is detected, the stylus continues transmitting power to the haptic circuit. If the second user interaction is not detected, the stylus ceases transmitting power to the haptic circuit.

11 Claims, 9 Drawing Sheets

(56) References Cited

U.S. PATENT DOCUMENTS

| | | | |
|---|---|---|---|
| 2002/0126432 A1* | 9/2002 | Goldenberg | G06F 3/016 361/103 |
| 2009/0135164 A1* | 5/2009 | Kyung | G06F 3/016 345/173 |
| 2010/0141407 A1* | 6/2010 | Heubel | H04B 5/0037 340/407.1 |
| 2010/0277505 A1 | 11/2010 | Ludden et al. | |
| 2012/0249474 A1* | 10/2012 | Pratt | G06F 1/1694 345/174 |
| 2012/0327040 A1* | 12/2012 | Simon | G06F 3/03545 345/179 |
| 2013/0106714 A1* | 5/2013 | Shahparnia | G06F 3/03545 345/173 |
| 2013/0106763 A1* | 5/2013 | Bakken | G06F 3/03545 345/173 |
| 2013/0135262 A1* | 5/2013 | Alameh | G06F 3/03545 345/179 |
| 2013/0257777 A1* | 10/2013 | Benko | G06F 3/0383 345/173 |
| 2014/0078070 A1* | 3/2014 | Armstrong-Muntner | G06F 3/0441 345/173 |
| 2014/0101545 A1* | 4/2014 | Paek | G06F 3/0488 715/702 |
| 2014/0340328 A1 | 11/2014 | Kameyama et al. | |
| 2015/0005039 A1* | 1/2015 | Liu | H04M 19/04 455/567 |
| 2015/0215450 A1* | 7/2015 | Seo | H04L 67/10 455/566 |
| 2015/0241970 A1* | 8/2015 | Park | G06F 3/03545 345/173 |
| 2016/0018891 A1* | 1/2016 | Levesque | H05K 999/99 345/174 |
| 2016/0063828 A1* | 3/2016 | Moussette | G06F 3/0488 340/691.5 |
| 2016/0301796 A1* | 10/2016 | Tuli | G06F 3/0484 |
| 2016/0342208 A1 | 11/2016 | Levesque et al. | |
| 2017/0003767 A1* | 1/2017 | Holsen | G06F 3/0443 |
| 2017/0046025 A1* | 2/2017 | Dascola | G06F 3/0482 |
| 2017/0068342 A1* | 3/2017 | Zimmerman | G06F 3/04162 |
| 2017/0178470 A1* | 6/2017 | Khoshkava | H04M 1/0268 |
| 2017/0212589 A1* | 7/2017 | Domenikos | G06F 3/016 |
| 2017/0249028 A1* | 8/2017 | Marshall | G06F 3/0418 |
| 2017/0285774 A1* | 10/2017 | Parikh | G06F 3/167 |
| 2017/0364167 A1 | 12/2017 | Ribeiro et al. | |
| 2018/0129305 A1* | 5/2018 | Fleck | G06F 3/0383 |
| 2018/0224864 A1* | 8/2018 | Kline | G05D 1/0259 |
| 2018/0373337 A1* | 12/2018 | Modarres | G06F 3/016 |
| 2019/0054373 A1* | 2/2019 | Phan | G06F 3/038 |
| 2019/0101971 A1* | 4/2019 | Shahparnia | G06F 3/03545 |
| 2019/0222073 A1* | 7/2019 | Lee | H04B 5/0037 |
| 2020/0012358 A1* | 1/2020 | Marshall | G06F 3/03545 |
| 2020/0089360 A1* | 3/2020 | Sen | G06F 3/04886 |
| 2021/0034101 A1* | 2/2021 | Yildiz | G06F 1/1616 |
| 2021/0135088 A1* | 5/2021 | Bikumala | H01L 35/32 |
| 2021/0232240 A1* | 7/2021 | Smith | G06F 3/04162 |
| 2021/0364054 A1* | 11/2021 | Sheikholeslami | G08B 6/00 |

OTHER PUBLICATIONS

"International Search Report and Written Opinion Issued in PCT Application No. PCT/US22/022977", dated Jul. 21, 2022, 12 Pages.

* cited by examiner

STYLUS HAPTIC COMPONENT ARMING AND POWER CONSUMPTION

BACKGROUND

A variety of input devices have been developed that provide haptic output. As one example, a stylus may provide haptic output in the form of vibration applied to a body of the stylus via an internal motor.

SUMMARY

Examples are disclosed that relate to applying haptic output to a touch-sensitive input device utilizing a plurality of user interactions. One example provides, in a stylus for use with a display screen of a computing device, a method for arming and managing power consumption of a haptic feedback component in the stylus. The method comprises, prior to actuating the haptic feedback component to produce haptic output, and at least on condition of detecting a first user interaction with the stylus, transmitting power for at least a first time period to a haptic circuit communicatively coupled to the haptic feedback component. When the first time period expires, the method determines if a second user interaction with the stylus is detected. If the second user interaction with the stylus is detected, the method continues to transmit power to the haptic circuit. If the second user interaction with the stylus is not detected, the method ceases to transmit power to the haptic circuit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A variety of input devices have been developed that provide haptic output to a user. As one example, a stylus may provide haptic output in the form of vibration applied to a body of the stylus via an internal motor. Other examples of input devices that may provide haptic feedback include game controllers and smartphones. These and other input devices may provide haptic output for a variety of purposes, including but not limited to indicating input to an application (e.g., drawing or writing on a touch-sensitive display screen), simulating a tactile sensation (e.g., resulting from the traversal of a virtual surface such as gravel, or from touching a virtual object), simulating a force, and confirming a user input (e.g., in response to user selection of a graphical user interface element).

In some examples and with certain activities performed with the stylus, it is desirable to reduce any delay between the time the user starts the activity and the provision of haptic output (user-perceptible vibration) from the haptic motor. Another consideration in stylus design is maximizing power efficiency, particularly given that the smaller form factors of styli can limit battery capacity for power storage.

Accordingly, examples are disclosed that relate to a stylus configured to use predictions of upcoming haptic activities to reduce latency in providing haptic output, while also reducing impact on power consumption and corresponding battery life of the stylus. As described in more detail below, in different examples the styli and techniques of the present disclosure detect user interactions with a stylus to predict an upcoming haptic activity, and in response arm the haptic feedback component or a haptic circuit coupled to the component. Additionally, logic flows manage different user interactions with the stylus to intelligently and dynamically arm and disarm the haptic feedback component or circuit in a manner that reduces power consumption and thereby increases battery life.

Figure 1:
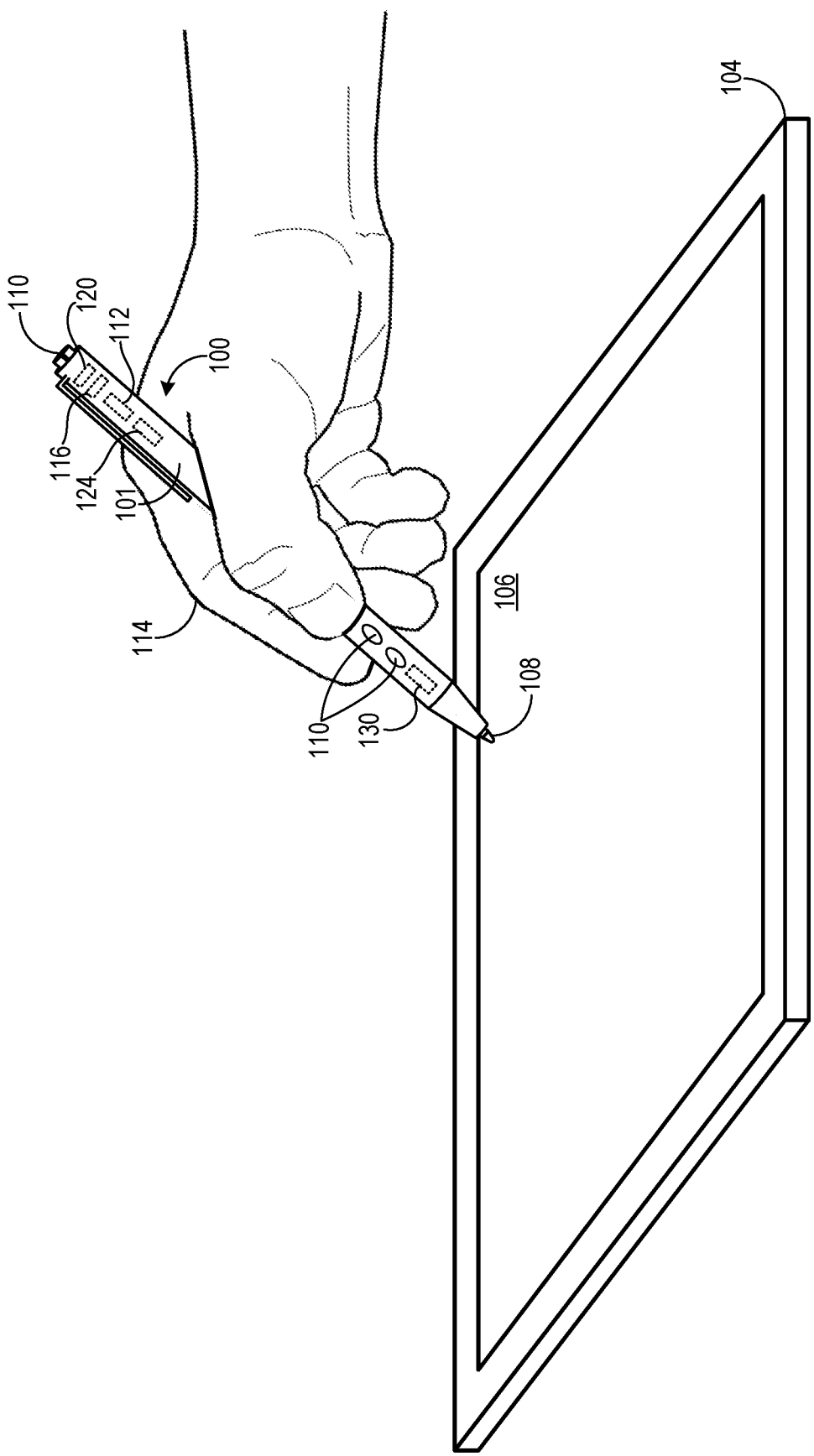
FIG. 1 shows a stylus and computing device with a touch-sensitive display according to examples of the present disclosure.
Figure 2:
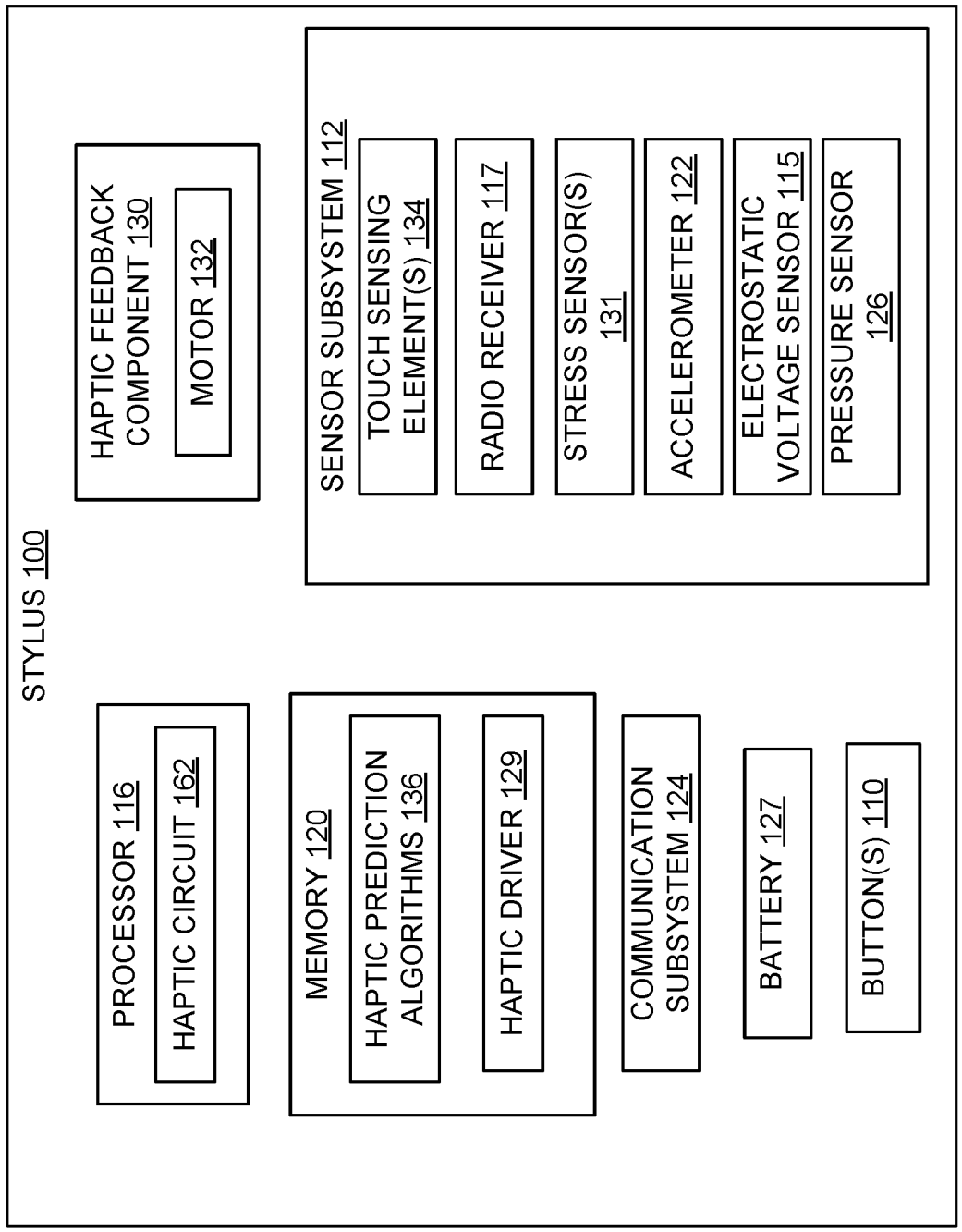
FIG. 2 shows a schematic diagram of components of the stylus of FIG. 1 according to examples of the present disclosure.

With reference now to FIGS. 1 and 2, one example of a stylus 100 according to examples of the present disclosure is depicted. Stylus 100 includes an elongated body 101 in the form factor of a pen, though the body may assume any suitable form. As shown in the depicted example, stylus 100 is operable to provide user input to a computing device 104. Computing device 104 is shown in the form of a mobile computing device (e.g., tablet) but may assume any suitable form. Any suitable type of user input may be provided to computing device 104 using stylus 100. As examples, stylus 100 may be used to write or draw graphical content on a touch-sensitive display 106 of computing device 104, modify displayed graphical content (e.g., resize, reposition, rotate), erase graphical content, select graphical user interface (GUI) elements, and/or provide gestural input.

In some examples, to enable the provision of user input from stylus 100 to computing device 104, the stylus may include a communication subsystem 124 that can transmit energy and/or data from the stylus to the computing device. For example, the communication subsystem 124 may include a radio transmitter for wirelessly transmitting data to computing device 104 along a radio link. As another example, the communication subsystem 124 alternatively or additionally may include a capacitive transmitter for wirelessly transmitting data to computing device 104 along a capacitive link. The capacitive link may be established between the capacitive transmitter and the touch-sensitive display 106 having a capacitive touch sensor, for example.

Any suitable data may be transmitted to computing device 104 via the communication subsystem 124, including but not limited to indications of actuation at stylus 100 (e.g., depression of one or more buttons 110), data regarding the position of the stylus relative to the computing device (e.g., one or more coordinates), a power state or battery level of the stylus, and data from one or more motion sensors on-board the stylus (e.g., accelerometer data). In some examples, data regarding the locations of contact points between a user hand 114 and stylus 100, which may be sensed by the stylus as described below, may be transmitted to computing device 104 via the communication subsystem 124.

It will be understood that any suitable mechanism may be used to transmit information from stylus 100 to computing device 104. Additional examples include optical, resistive, and wired mechanisms. In other examples, styli according to the present disclosure do not include a communication subsystem for transmitting energy and/or data from the stylus to a computing device.

In some examples of the present disclosure, in addition to or instead of transmitting data to the computing device, a stylus is configured to receive energy and/or data from computing device 104. In the example of FIGS. 1 and 2, stylus 100 includes a sensor subsystem 112 that comprises an electrostatic voltage sensor 115 configured to receive electrostatic energy signals from the touch-sensitive display 106 over an electrostatic channel, such as a frequency changing channel. In some examples, these signals are provided by capacitively-coupled currents from electrodes of the touch-sensitive display 106. These signals are amplified and converted to digital signals for use by a processor 116 of the stylus 100.

In some examples, sensor subsystem 112 can include one or more other sensing components and functionalities, such as accelerometer(s), gyroscope(s), inertial measurement unit (s), and force (pressure) sensor(s). In the present example, sensor subsystem 112 includes an accelerometer 122, and a pressure sensor 126 at the tip 108 of stylus 100, such as a piezoelectric crystal that provides an output voltage in response to the pressure imposed upon it. In some examples, sensor subsystem 112 comprises one or more stress sensors 131 at various locations along the body 101. The one or more stress sensors 131 are configured to output body stress values exerted on the body 101 of the stylus 100 by a user's hand 114.

In some examples, sensor subsystem 112 includes touch-sensing elements 134 at various locations along the body 101 that are configured to output data indicating locations along the body of contact points between the body and one or more fingers and/or other portions of a user's hand. In different examples, the touch-sensing elements 134 may be arranged along the axial length of the stylus and/or extend circumferentially around the stylus. The touch-sensing elements 134 may assume any suitable form. For example, touch-sensing elements 134 may sense contact at stylus 100 capacitively. In such examples, touch-sensing elements 134 may be driven by drive circuitry and coupled to receive circuitry that is configured to produce an output (e.g., voltage, current) indicative of the presence or absence of contact.

Example hardware, including processor 116, memory 120 and communication subsystem 124, that may be incorporated by stylus 100 to implement the disclosed approaches, is described further below with reference to FIG. 5. In some examples the processor 116 includes a haptic circuit 128 configured to execute a haptic driver 129 that controls activation of the haptic feedback component 130. Stylus 100 further includes one or more batteries 127 configured to provide power to processor to the various components of the stylus.

As noted above, stylus 100 is configured to provide haptic feedback to users. To this end, stylus 100 includes a haptic feedback component 130 configured to apply haptic output to the body. As shown in the example of FIG. 1, haptic feedback component 130 is arranged within body 101 toward tip 108. In other examples, one or more haptic components may be provided at any suitable location within stylus 100. Haptic feedback component 130 may employ any suitable component(s) to provide haptic feedback as described herein. As one example, haptic feedback component 130 may include a motor 132 that applies haptic output to body 101 in the form of vibration induced in the body. In some examples, multiple haptic feedback components are provided at different locations within a stylus.

As noted above, styli and other user input devices with haptic output functionality can generate haptic output for a variety of purposes and in response to different user activities. Examples include indicating input to an application, contact with a touch-sensitive display screen, simulating a tactile sensation or a force, and confirming a user input. In these and other use cases, it is desirable to reduce any delay between the time the user starts the activity and the provision of haptic output (user-perceptible vibration) from the haptic feedback component. Also as noted above, given that smaller form factors of styli can limit battery capacity for power storage, another consideration in stylus design is maximizing power efficiency.

Accordingly and in one potential advantage of the present disclosure, to reduce delay between the start of an activity and the provision of haptic output, and to efficiently manage power consumption of the haptic feedback component, one or more haptic prediction algorithms 136 are utilized to selectively arm the haptic feedback component prior to the start of the activity. In this manner, the haptic feedback component 130 is prepared to quickly provide haptic output upon request by the haptic circuit 162 of the stylus 100. As described in more detail below, in some examples the haptic feedback component 130 is armed by transmitting power from the stylus battery to the haptic circuit 162 without actuating the motor 132. In this manner and with the circuit pre-energized, the haptic motor 132 can be more quickly actuated in response to a request for haptic output.

In other examples, and in another potential advantage of the present disclosure, the haptic feedback component motor 132 is armed by energizing the haptic circuit 162 along with actuating the haptic feedback component to vibrate very slightly at a user-imperceptible magnitude (i.e., without providing haptic output). In this manner, by providing a low power signal to the haptic motor 132 to cause the haptic feedback component to imperceptibly vibrate, when a request for haptic output is received, the haptic circuit 162 can quickly increase the signal gain to provide haptic output with an even faster response time than in the previous example. In this manner, with both the circuit and the haptic motor pre-energized, the motor can be even more quickly actuated in response to a request for haptic output. In some implementations, the techniques described herein can minimize any delay between the start of an activity and the provision of haptic output and/or minimize power consumption.

Additionally, and as described in more detail below, in different examples a stylus can detect and utilize one or more user interactions to predict that the user will be engaging in an activity that calls for haptic output by the stylus (e.g., a haptic activity). In this manner, and prior to actuating the haptic feedback component to produce haptic output, haptic prediction algorithms 136 can analyze the user interaction(s) to selectively arm the haptic feedback component 130 before the activity begins. Advantageously, by utilizing the haptic prediction algorithms 136 to predict upcoming haptic activities, the methods and styli of the present disclosure can arm the haptic feedback component 130 to quickly provide haptic output when an upcoming haptic activity is likely, and likewise can disarm the haptic feedback component when a haptic activity is not predicted to thereby conserve power resources and extend battery life.

Figure 3A:
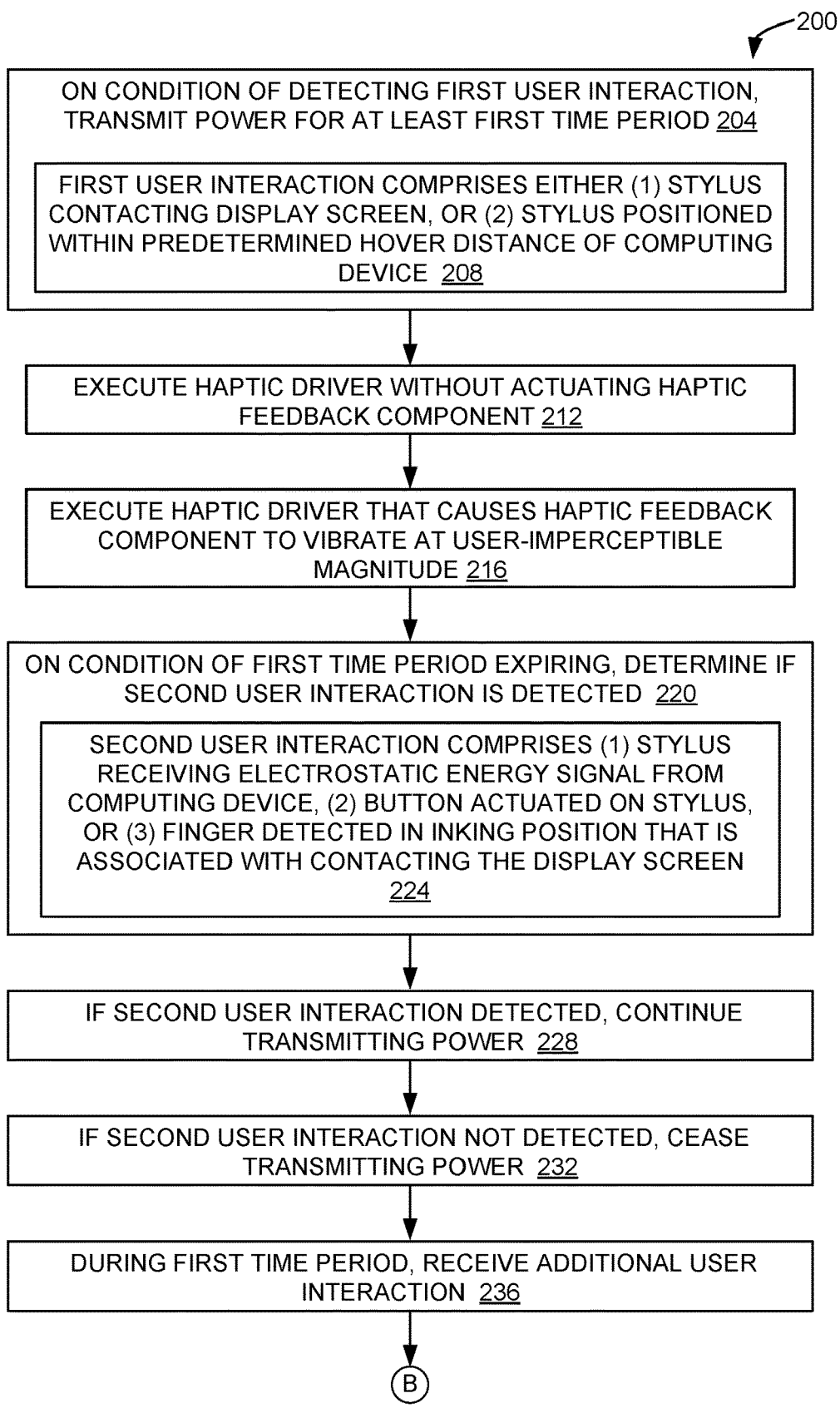
FIGS. 3A-3C show a flowchart illustrating a method for arming and managing power consumption of a haptic feedback component in a stylus according to examples of the present disclosure.
Figure 3B:
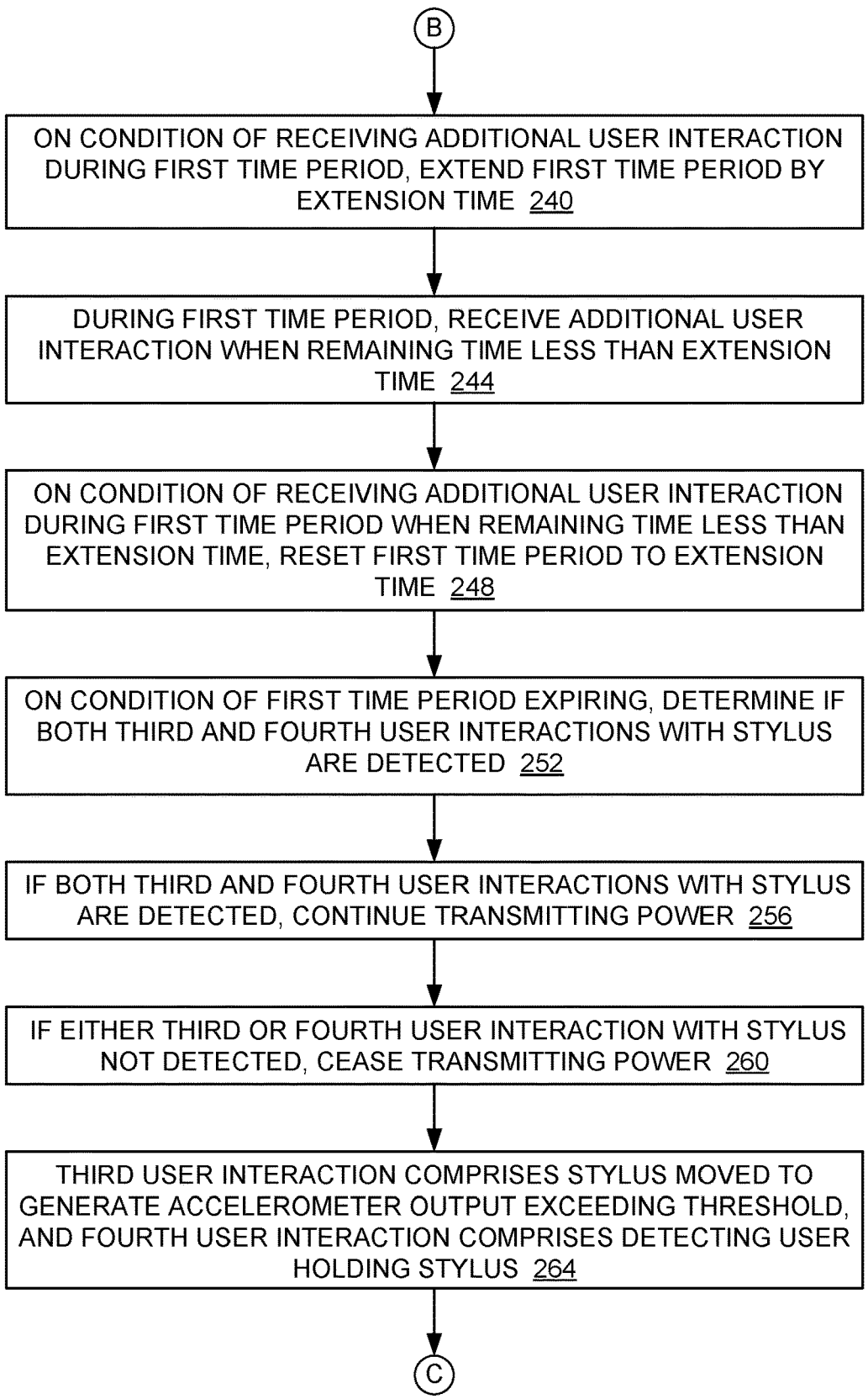
Figure 3C:
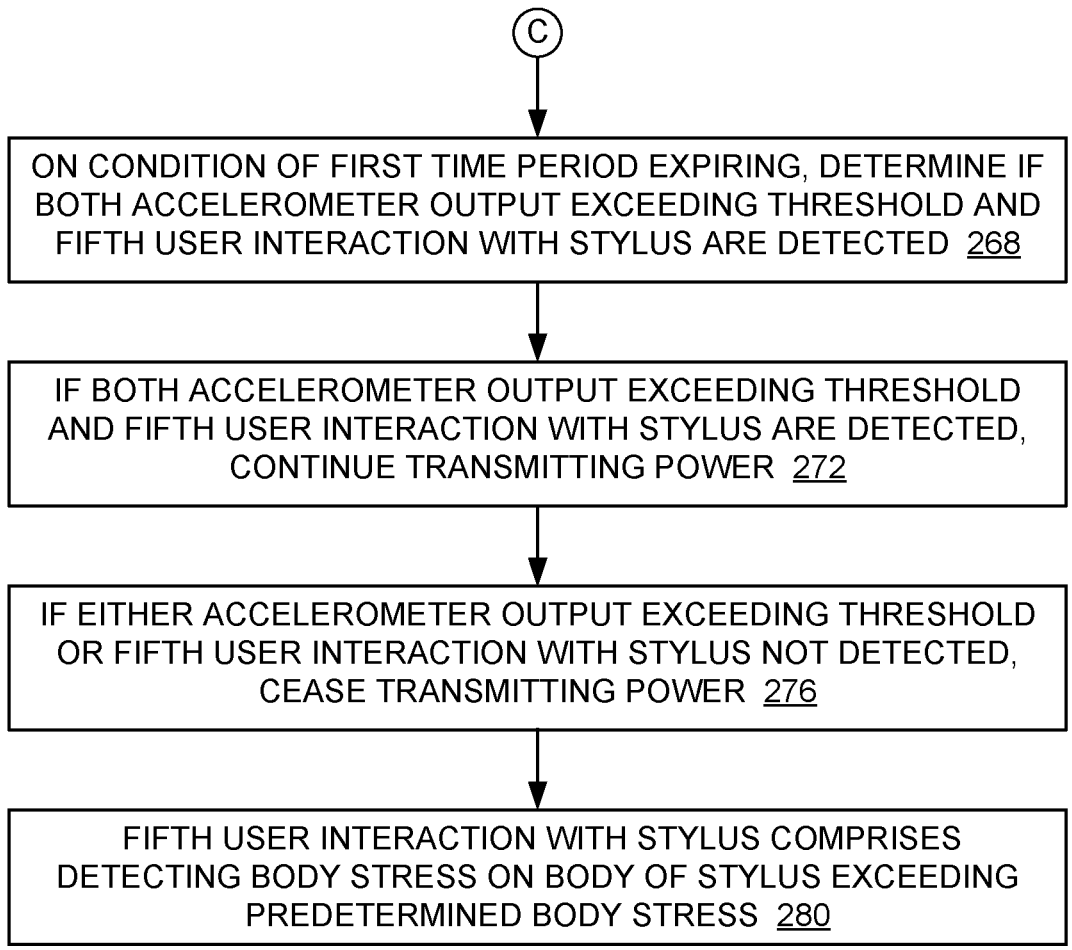

FIGS. 3A-3C depict a flowchart illustrating one method 200 for arming and managing power consumption of a haptic feedback component in the stylus prior to actuating the component to produce haptic output. Method 200 may be implemented at stylus 100, for example. The following description of method 200 is provided by way of example and is not meant to be limiting. Therefore, it is to be understood that method 200 may include additional and/or alternative steps relative to those illustrated in FIGS. 3A-3C. Further, it is to be understood that the steps of method 200 may be performed in any suitable order. Further still, it is to be understood that one or more steps may be omitted from method 200 without departing from the scope of this disclosure. It will also be appreciated that method 200 also may be performed in other contexts using other suitable components.

At 204 method 200 includes, at least on condition of detecting a first user interaction with the stylus 100, transmitting power for at least a first time period to haptic circuit 162 communicatively coupled to the haptic feedback component 130. In one example, the first user interaction with the stylus 100 comprises either (1) an inking activity in which the stylus contacts the touch-sensitive display 106 of the computing device 104, or (2) a hover activity in which the stylus is positioned within a predetermined hover distance of the computing device 104. For the inking activity, in some examples contact between the stylus 100 and touch-sensitive display 106 can be detected by the computing device 104 and an indication of such contact can be transmitted to the stylus 100, such as via electrostatic energy or radio waves. In other examples, stylus 100 can detect contact between the stylus and touch-sensitive display 106, such as via a pressure sensor 126 in tip 108. Regarding the inking activity, in some examples an inking activity also includes any activity in which a pressure indication is transmitted from the stylus 100 to the computing device 104, including contact between the stylus tip 108 and any surface, such as using the stylus like a mouse by touching and moving the tip along a desk surface.

Regarding the hover activity, in different examples, the predetermined hover distance is selected to correspond to a distance between the stylus 100 and computing device that suggests the user will soon contact the computing device with the stylus. In some examples, the predetermined hover distance may be selected based at least in part on the form factor and/or size of the computing device with which the stylus 100 is utilized. For example, with a mobile computing device such as computing device 104, the predetermined hover distance may be between 0.5 cm. and 15.0 cm., or between 1.0 cm and 5.0 cm, or may be 1.0 cm. In larger computing devices the predetermined hover distance can be larger. In one example, for a 60-inch diagonal touch-screen display device, the predetermined hover distance may be 50 cm.

In other examples and as described further below, other user interactions with the stylus 100 may be selected as the first user interaction described herein.

As noted above, when the first user interaction with the stylus 100 is detected, power is transmitted to haptic circuit 162 to enable fast actuation of the haptic feedback component 130. Returning to FIG. 3A, at 212 the method 200 includes energizing the haptic circuit 162 by executing haptic driver 129, and refraining from providing power to actuate the haptic feedback component. In one potential advantage of this example, a minimal amount of power is utilized to execute the haptic driver in preparation for a predicted haptic activity. For example, energizing the haptic driver in this manner may consume an additional 1 mA of power.

In other examples, at 216 the method 200 includes transmitting power to the haptic circuit 162 and executing the haptic driver 129 to cause the haptic feedback component 130 to vibrate at a user-imperceptible magnitude. In other words, the haptic feedback component 130 is actuated at a very low level to vibrate at a magnitude that is not felt by a user holding the stylus 100 (e.g., it does not produce haptic output). Advantageously, by maintaining the haptic feedback component 130 in this pre-energized state, haptic output can be more quickly initiated by simply increasing the gain to the haptic motor.

In these examples, when a first user interaction indicating an upcoming haptic event is detected and power begins flowing to haptic circuit 162, the haptic prediction algorithms 136 continue transmitting power for at least a first time period. In some examples, a timer is set to the first time period and begins running when power begins flowing to the haptic circuit 162. In some examples, when another first user interaction is detected before the first time period expires, the timer is reset to the first time period and restarted. In different examples and use cases, any suitable first time period may be utilized. In one example use case, where the first user interaction is either the inking activity in which the stylus contacts the touch-sensitive display 106 or the hover activity in which the stylus is positioned within a predetermined hover distance of the computing device 104, the first time period may be 8 seconds.

When the first time period expires, the stylus may determine if another user interaction is detected that suggests a haptic event is upcoming. With reference again to FIG. 3A, at 220 the method 200 includes, at least on condition of determining that the first time period expires, determining if a second user interaction with the stylus is detected. In one example and at 224 of method 200, the second user interaction with the stylus 100 comprises (1) an uplink activity in which the stylus receives an electrostatic energy signal from the computing device, (2) a button press activity in which a button is actuated on the stylus, or (3) an inking finger position activity in which at least one user finger is detected on the stylus in an inking position that is associated with contacting the stylus to the display screen of the computing device.

Regarding detecting the uplink activity, the stylus 100 can determine if the electrostatic energy signal is currently being received from the computing device. Regarding detecting the button press activity, the stylus 100 can determine if a button 110 on the stylus has been actuated within a prior time period, such as within the previous 5 seconds. In other examples any suitable time period may be utilized.

Regarding detecting the inking finger position activity, in some examples the stylus 100 can determine locations and/or areas on the stylus body 101 where one or more user digits or portions of the user's hand are contacting the body, and can use this data to generate one or more contact patterns. These contact patterns can be compared to stored contact patterns that have been predetermined to be associated with the user contacting the stylus to the display screen. For example and with reference to FIG. 1, the illustrated example grip of a user's hand 114 on stylus body 101 may be frequently utilized when the user is writing or drawing on the touch-sensitive display 106 of the computing device 104. The contact pattern of this grip may be stored in memory 120 of the stylus 100 and tagged or otherwise designated as an inking position that is associated with contacting the stylus to the touch-sensitive display 106. Accordingly, when the stylus 100 determines if a second user interaction with the stylus is detected, the stylus can compare a currently detected contact pattern of a user's hand on the stylus with this stored contact pattern to determine if at least one user finger is in an inking position.

Returning to FIG. 3A, at 228 the method 200 includes, if the second user interaction with the stylus is detected, then continuing to transmit power to the haptic circuit. In this manner, when a second user interaction that predicts an upcoming haptic event is detected, the system continues to arm the haptic feedback component 130 by continuing to transmit power to the haptic circuit.

At 232 of method 200, if a second user interaction with the stylus is not detected when the first time period expires, then the stylus 100 ceases transmitting power to the haptic circuit 162. Advantageously and in this manner, the stylus 100 conserves power when it determines that an upcoming haptic event is not likely to occur. More particularly, the stylus 100 avoids unnecessarily powering the haptic circuit 162 or both the haptic circuit and haptic feedback component 130, thereby reducing power consumption and extending battery life.

In some examples, the first time period after detecting the first user interaction can be extended upon receiving an additional user interaction with the stylus 100. With reference again to FIG. 3A, at 236 the method 200 includes, during the first time period receiving an additional user interaction with the stylus 100. With reference now to FIG. 3B, at 240 the method 200 includes, on condition of receiving the additional user interaction with the stylus 100 during the first time period, extending the first time period by an extension time. In one example, where the first time period is 8 seconds and an additional user interaction with the stylus 100 is received 2 seconds into the 8 second period, the 8 second period is extended by an extension time of 3 seconds to a new total of 11 seconds. In different examples and use cases, any combination of different first time periods and different extension times can be utilized.

In other examples, the first time period after detecting the first user interaction can be reset in a different manner upon receiving an additional user interaction with the stylus 100 near the end of the first time period. With reference to FIG. 3B, at 244 the method 200 includes, during the first time period receiving an additional user interaction with the stylus 100 when a remaining time in the first time period is less than an extension time. At 248 the method 200 includes, on condition of receiving the additional user interaction with the stylus during the first time period when the remaining time is less than the extension time, resetting the first time period to the extension time.

In one example, where the first time period is 8 seconds, an extension time is 3 seconds, and an additional user interaction with the stylus 100 is received 7 seconds into the 8 second period (e.g., with 1 second remaining), the first time period is reset to the extension time of 3 seconds and restarted. In different examples and use cases, various combinations of different first time periods and different extension times can be utilized.

As noted above, when the first time period expires the stylus 100 may determine if a second user interaction with the stylus is detected. And on condition of detecting a second user interaction, the stylus continues transmitting power to the haptic circuit 162. In some examples, the stylus 100 may determine if two or more user interactions with the stylus are detected. For example and with reference to FIG. 3B, at 252 the method 200 includes, on condition of determining that the first time period expires, determining if both a third user interaction with the stylus and a fourth user interaction with the stylus are detected. At 256, if the third user interaction and the fourth user interaction with the stylus are detected, then the stylus continues to transmit power to the haptic circuit. In this manner, the detection of two user interactions occurring together can be utilized to predict an upcoming haptic activity. Conversely and at 260, if either the third user interaction or the fourth user interaction with the stylus is not detected, then the stylus 100 ceases transmitting power to the haptic circuit 162.

In some examples and at 264, the third user interaction with the stylus comprises movement of the stylus that generates an accelerometer output exceeding a predetermined acceleration threshold. In this manner, quicker movements of the stylus that can precede a user touching the touch-sensitive display 106 can be detected. In these examples, the fourth user interaction with the stylus can comprise detecting a user holding the stylus, such as via the touch-sensing elements 134 described above. Advantageously, by requiring the detection of the user holding the stylus 100 in combination with detecting an accelerometer output exceeding the predetermined acceleration threshold, other rapid accelerations of the stylus, such as from falling off a table to the floor, are excluded from predicting a haptic event.

In other examples and with reference now to FIG. 3C, at 268 the method 200 includes, on condition of determining that the first time period expires, determining if both the accelerometer output exceeding the predetermined acceleration threshold and a fifth user interaction with the stylus are detected. At 272, if the accelerometer output exceeds the predetermined acceleration threshold and the fifth user interaction with the stylus are detected, then the stylus continues to transmit power to the haptic circuit. Conversely and at 276, if either the accelerometer output does not exceed the predetermined acceleration threshold or the fifth user interaction with the stylus is not detected, then the stylus 100 ceases transmitting power to the haptic circuit 162.

In some examples and at 280, the fifth user interaction with the stylus 100 comprises detecting a body stress on the body 101 of the stylus that exceeds a predetermined body stress, such as via the stress sensor(s) 131 described above. The predetermined body stress value may be selected to correspond to the body stress exerted by a user's fingers lightly holding the stylus 100. In this manner, and as with the prior example, by also requiring the detection of the body stress exceeding the predetermined body stress, other rapid accelerations of the stylus, such as from falling off a table to the floor, are excluded from predicting a haptic event.

The above-described examples are merely exemplary and provided for descriptive purposes. In other examples, other combinations of the aforementioned user interactions with the stylus 100 as well as other examples of user interactions with the stylus that suggest an upcoming haptic activity may be utilized. The principles of the present disclosure are intended to encompass all such examples and variations.

Figure 4A:
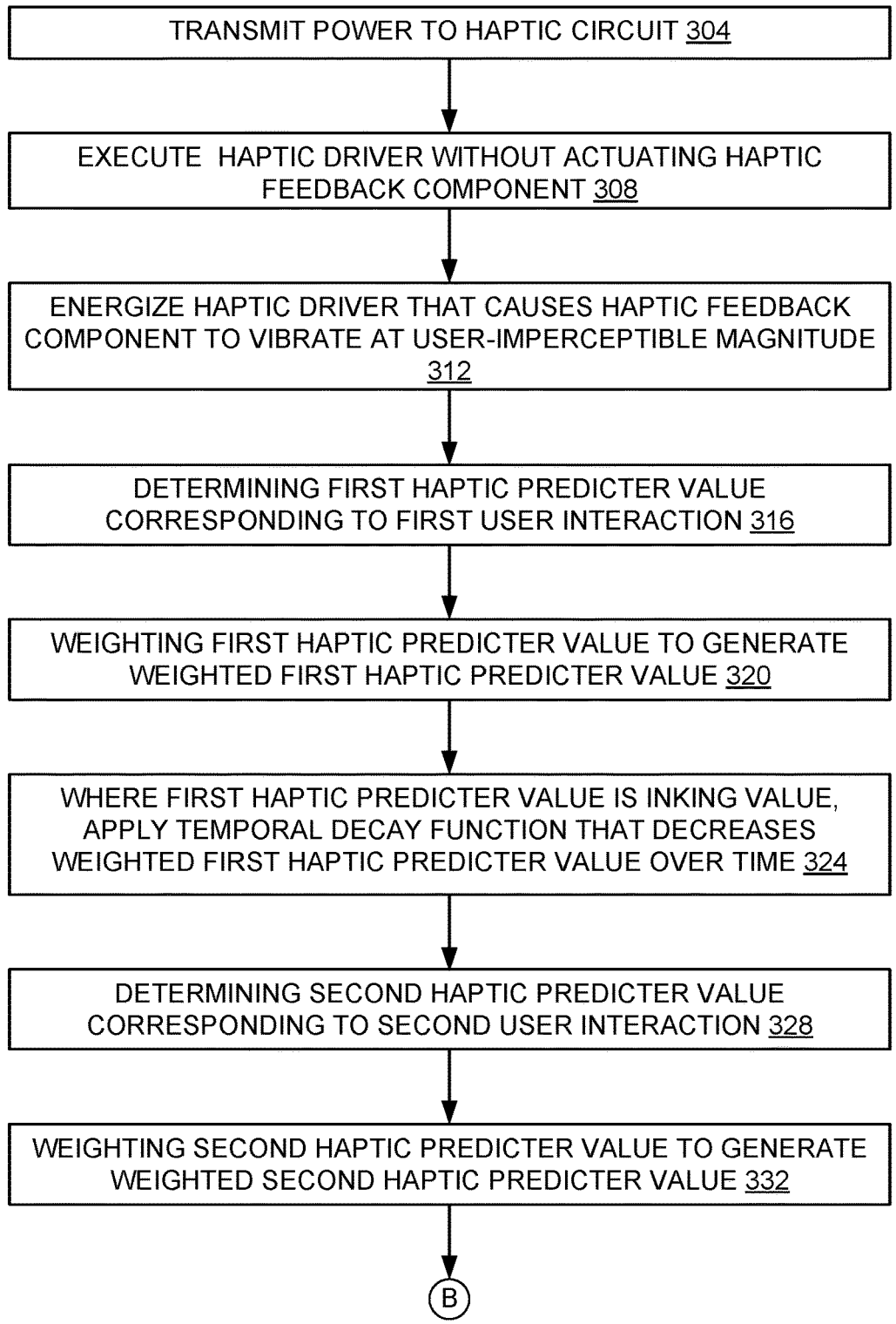
FIGS. 4A-4C show a flowchart illustrating another method for arming and managing power consumption of a haptic feedback component in a stylus according to examples of the present disclosure.
Figure 4B:
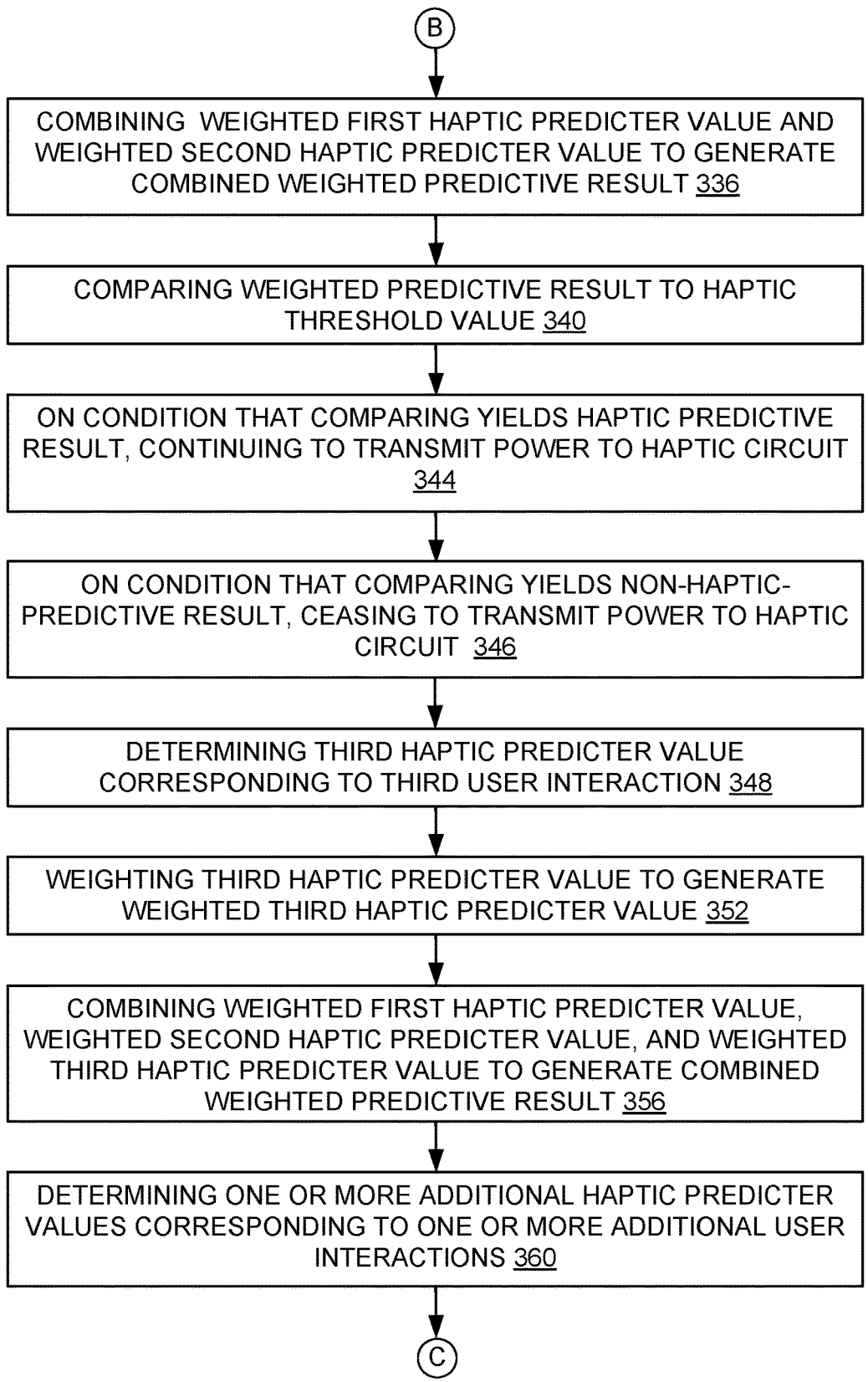
Figure 4C:
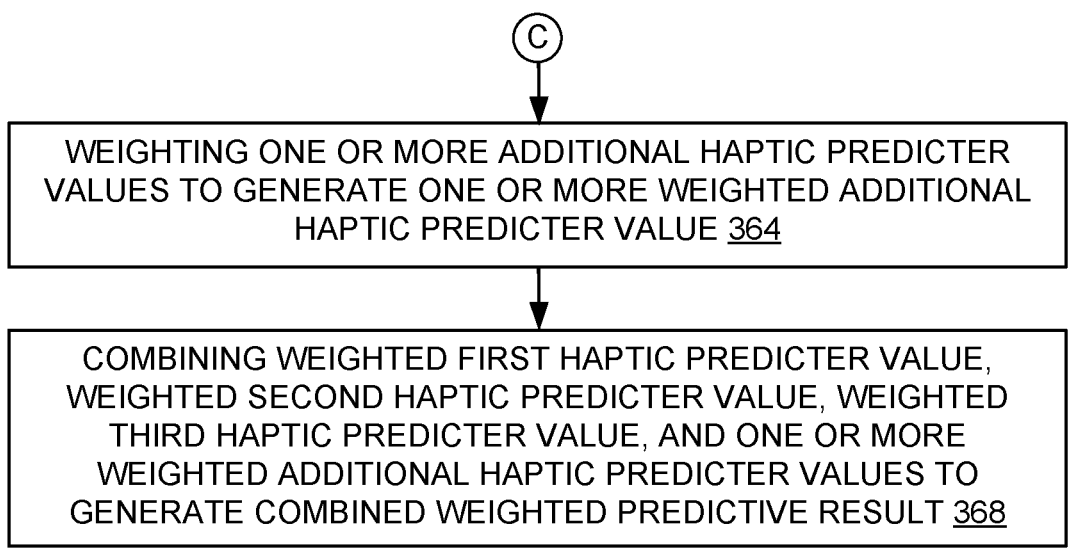

With reference now to FIGS. 4A-4C, in other examples the stylus 100 can utilize haptic prediction algorithms 136 that apply weighted logic to different user interactions with the stylus to predict upcoming haptic activities. As with the examples described above, in these examples and prior to actuating the haptic feedback component 130 to produce haptic output, haptic prediction algorithms 136 can analyze the user interaction(s) to selectively arm the haptic feedback component before the activity begins.

FIGS. 4A-4C depict a flowchart illustrating another method 300 that utilizes weighted haptic predicter values to arm and manage power consumption of a haptic feedback component in the stylus 100 prior to actuating the component to produce haptic output. Method 300 may be implemented at stylus 100, for example. The following description of method 300 is provided by way of example and is not meant to be limiting. Therefore, it is to be understood that method 300 may include additional and/or alternative steps relative to those illustrated in FIGS. 4A-4C. Further, it is to be understood that the steps of method 300 may be performed in any suitable order. Further still, it is to be understood that one or more steps may be omitted from method 300 without departing from the scope of this disclosure. It will also be appreciated that method 300 also may be performed in other contexts using other suitable components.

At 304 method 300 includes transmitting power to a haptic circuit 162 communicatively coupled to the haptic feedback component 130 of stylus 100. In some examples and as noted above, initiating such power transmission can be triggered by detection of one or more user interactions with the stylus 100. At 308 the method 300 includes executing only a haptic driver 129 of the haptic circuit 162, such that power is not provided to actuate the haptic feedback component 130. As noted above and in one potential advantage of this example, a minimal amount of power is utilized to execute the haptic driver 129.

In other examples, at 312 the method 300 includes transmitting power to the haptic circuit 162 with the haptic driver 129 causing the haptic feedback component 130 to vibrate at a user-imperceptible magnitude that is not felt by a user holding the stylus 100. As noted above, by maintaining the haptic feedback component 130 in this pre-energized state, haptic output can be more quickly initiated by simply increasing the gain to the haptic motor.

At 316 the method 300 includes determining a first haptic predicter value corresponding to a first user interaction with the stylus 100. As explained above, a variety of different user interactions with the stylus 100 may be detected, such as the inking and hover activities described above. In some examples and for each of the user interactions, a predetermined haptic predicter value is selected and stored in memory 120 of stylus 100. For some user interactions the haptic predicter value may be a discrete value corresponding to a likelihood that a particular user interaction with the stylus 100 will precede a haptic activity. Accordingly, upon detecting a first user interaction with the stylus 100, a first haptic predicter value corresponding to this particular user interaction is then determined.

In one example, the first haptic predicter value is either (1) an inking value with the corresponding first user interaction with the stylus 100 comprising the inking activity discussed above in which the stylus contacts the touch-sensitive display 106 of the computing device 104 or another surface, or (2) a hover value with the corresponding first user interaction with the stylus comprising the hover activity in which the stylus is positioned within the predetermined hover distance of the computing device. As described in the use case examples below, the inking value and hover value may be discrete numerical values accessed in memory 120 of the stylus 100.

At 320 the method 300 includes generating a weighted first haptic predicter value by weighting the first haptic predicter value. In different examples, the first haptic predicter value may be weighted in any suitable manner to reflect the likelihood that the corresponding user interaction with the stylus 100 will precede a haptic activity. In one example and as described in more detail below, where the first haptic predicter value is the inking value, at 324 the method 300 includes weighting the inking value by applying a temporal decay function to the value that decreases the weighted inking value over time. Similarly and in other examples where the first haptic predicter value is the hover value, the hover value may be weighted by applying a temporal decay function that decreases the weighted hover value over time. As described in more detail below, the weighted first haptic predicter value is combined with one or more other weighted predicter values and compared to a haptic predictive threshold value to determine whether to continue transmitting power to the haptic circuit.

With reference again to FIG. 4A, at 328 the method 300 includes determining a second haptic predicter value corresponding to a second user interaction with the stylus 100. In one example, the second haptic predicter value is either (1) an uplink value with the corresponding second user interaction with the stylus comprising the uplink activity in which the stylus receives an electrostatic energy signal from the computing device, or (2) a button click value with the corresponding second user interaction with the stylus comprising the button activity in which a button actuated on the stylus.

At 332 the method 300 includes generating a weighted second haptic predicter value by weighting the second haptic predicter value. As with the first haptic predicter valuer, in different examples the second haptic predicter value may be weighted in any suitable manner to reflect the likelihood that the corresponding user interaction with the stylus 100 will precede a haptic activity. For example and as described in more detail below, where the first haptic predicter value is the uplink value, in some examples a predetermined uplink value (such as 1.0) is multiplied by a weighting factor. In some examples the weighting factor can be based at least in part on the one or more other predicter values utilized by the haptic prediction algorithm(s) 136. In one example where the first haptic predicter value corresponds to the inking activity, the weighting factor for the uplink value is selected as 0.5. Accordingly, and as discussed below, in this example the inking activity is given twice the importance/magnitude as compared to the uplink value when combining the two values and comparing to a haptic predictive threshold value to determine whether to continue transmitting power to the haptic circuit.

With reference now to FIG. 4B, at 336 the method 300 includes combining at least the weighted first haptic predicter value and the weighted second haptic predicter value to generate a combined weighted predictive result. At 340 the method includes comparing the combined weighted predictive result to a haptic predictive threshold value. At 344 the method 300 includes, on condition that comparing the combined weighted predictive result to the haptic predicter threshold value yields a haptic predictive result, continuing to transmit power to the haptic circuit. In some examples, the haptic predictive result is defined as the condition in which the combined weighted predictive result is greater than or equal to the haptic predicter threshold value. At 346 the method 300 includes, on condition that comparing the combined weighted predictive result to the haptic predicter threshold value yields a non-haptic-predictive result, ceasing to transmit power to the haptic circuit. In some examples, the non-haptic-predictive result is defined as the condition in which the combined weighted predictive result is less than the haptic predicter threshold value.

In one use case example, the stylus 100 begins transmitting power to the haptic circuit 162 upon detecting an inking activity in the form of contact between the stylus and the touch-sensitive display 106. As noted above, in some examples only the haptic driver 129 is executed and power is not provided to actuate the haptic feedback component. In other examples, power is transmitted to the haptic circuit 162 and the haptic feedback component 130 to cause the haptic feedback component 130 to vibrate at a user-imperceptible magnitude.

Next and at a predetermined sampling period, such as every 10 milliseconds, the stylus 100 determines an inking value corresponding to the detected inking activity, and generates a weighted inking value by weighting the inking value. In this example the inking value is a predetermined value of 8.0, and this value is weighted by applying a temporal decay function that decreases the weighted inking value over time. In this example, the temporal decay function is defined by subtracting from the predetermined inking value the time in seconds since the most recent inking activity was detected (e.g., 8.0–N, where N is the number of seconds since the most recent inking activity). In this example, N=3.0 and the weighted inking value is therefore 5.0.

The stylus 100 then determines an uplink value corresponding to uplink activity in which the stylus is operated to receive an electrostatic energy signal from the computing device 104. If the stylus 100 is currently receiving the electrostatic energy signal from the computing device 104, then an uplink value of 2.0 is determined, such as by retrieving from memory 120. In this example the uplink value is weighted by a factor of 1.5 to generate a weighted uplink value of 3.0. The weighted inking value of 5.0 is combined with the weighted uplink value of 3.0 to generate a combined weighted predictive result of 8.0. This combined weighted predictive result is then compared to a haptic threshold value. In this example the haptic threshold value is 4.5. Because 8.0>=4.5, the comparison yields a haptic predictive result indicating that a haptic event is likely to occur. Accordingly, and based on the comparison yielding a haptic predictive result, the stylus 100 continues to transmit power to the haptic circuit 162.

The above logic continues operating and sampling at a selected sampling period. As noted above, when comparing the combined weighted predictive result to the haptic predicter threshold value yields a non-haptic-predictive result, the stylus 100 ceases transmitting power to the haptic circuit. For example, when N=7.0 the weighted inking value is 8.0–7.0=1.0. If the stylus 100 is receiving the electrostatic energy signal from the computing device 104, then the uplink value of 2.0 is determined and weighted by the factor of 1.5 to generate a weighted uplink value of 3.0. The weighted inking value of 1.0 is combined with the weighted uplink value of 3.0 to generate a combined weighted predictive result of 4.0. When this combined weighted predictive result is compared to the haptic threshold value of 4.5, because 4.0<=4.5, the comparison yields a non-haptic-predictive result indicating that a haptic event is not likely to occur. Accordingly, and based on the comparison yielding a non-haptic-predictive result, the stylus 100 ceases transmitting power to the haptic circuit 162.

It will be appreciated that the values and weighting factors utilized in the foregoing examples are for illustrative purposes only, and other suitable values and weighting factors may be selected and utilized according to different use case scenarios, device requirements, and other criteria.

In some examples and with reference again to FIG. 4B, at 348 the method 300 includes determining a third haptic predicter value corresponding to a third user interaction with the stylus. At 352 the method 300 includes generating a weighted third haptic predicter value by weighting the third haptic predicter value by a third factor. At 356 the method 300 includes combining at least the weighted first haptic predicter value, the weighted second haptic predicter value, and the weighted third haptic predicter value to generate the combined weighted predictive result.

In one example, the third haptic predicter value is the button click value corresponding to the button activity in which the user actuates a button on the stylus. For example, if the stylus 100 determines that a button was actuated within a predetermined prior timeframe, then a button click value is determined, such as by retrieving from memory 120. In one exemplary use case example, the predetermined prior time frame is within the last 5 seconds and the button click value is 1.0. Accordingly, if the stylus 100 determines that a button was actuated in the prior 5 seconds, then a button click value of 1.0 is determined.

In one example and like the inking activity example discussed above, a weighted button click value may be generated by applying a temporal decay function based on the amount of time since the prior button click activity. In another example, a discrete weighting factor, such as 1.5, may be applied to the button click value regardless of the time since the prior button click activity. In this example, the button click value of 1.0 is multiplied by the weighting factor of 1.5 to generate a weighted button click value of 1.5. This weighted button click value of 1.5 is combined with the weighted inking value (such as 4.0) and the weighted uplink value (such as 1.5) to generate a combined weighted predictive result of 7.0. This combined weighted predictive result is then compared to a haptic threshold value, such as 5.5. In this example, because 7.0>=5.5, the comparison yields a haptic predictive result indicating that a haptic event is likely to occur. Accordingly, the stylus 100 continues to transmit power to the haptic circuit 162.

In some examples and with reference again to FIG. 4B, at 360 the method 300 includes determining one or more additional haptic predicter values corresponding to one or more additional user interactions with the stylus. With reference now to FIG. 4C, at 364 the method 300 includes generating one or more weighted additional haptic predicter values by weighting the one or more additional haptic predicter values by one or more additional factors. At 368 the method 300 includes combining at least the weighted first haptic predicter value, the weighted second haptic predicter value, the weighted third haptic predicter value, and the one or more weighted additional haptic predicter values to generate the combined weighted predictive result.

The one or more additional haptic predicter values may correspond to a variety of user interactions with the stylus that may suggest an upcoming haptic activity. For example, an additional haptic predicter value may comprise an accelerometer value generated by the accelerometer 122 of the stylus. In one example, any movement of the stylus 100 that generates an acceleration output is considered predictive of an upcoming haptic activity. In these examples, any acceleration output corresponds to determining a discrete accelerometer value, such as 2.0. In another example, for each of the x-y-z axes of the accelerometer, the output values are normalized between zero and a maximum value, such as 1.0. For a given acceleration, the outputs along each of the three axes are combined to yield a combined accelerometer value. In this example, the maximum combined accelerometer value is 3.0. A weighted accelerometer value is then generated by applying a weighting factor to the combined accelerometer value, such as dividing the value by 3. This weighted value is then combined with other weighted value(s) to generate the combined weighted predictive result, which is then then compared to a haptic threshold value as described above.

In other examples, one or more patterns of movement of the stylus 100 that have been determined to suggest that a haptic event is likely to occur may be recognized via output of the accelerometer. Examples of such patterns include movement in the direction of the touch-sensitive display 106 and other movement patterns that have been previously determined to precede haptic events.

Other examples of additional haptic predictor values include values associated with inking finger position activities, stylus body stress detections, and indications of the stylus contacting the touch-sensitive display 106 as discussed above. In different examples, the haptic predictor algorithms 162 may utilize various combinations of these haptic predictor values along with corresponding haptic threshold values to determine when to energize the haptic circuit in preparation for a predicted haptic activity, and when to cease transmitting power to the haptic circuit as discussed above.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
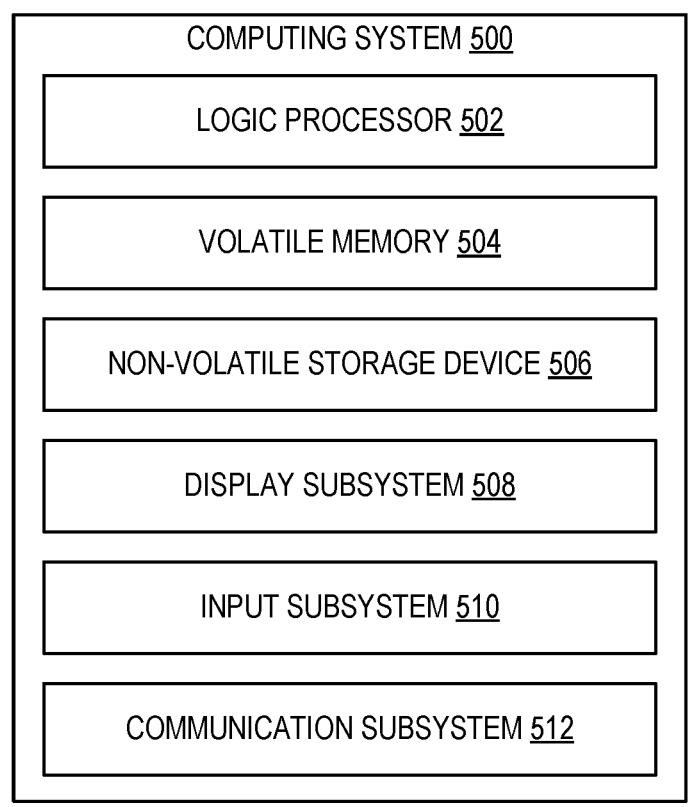
FIG. 5 schematically depicts an example computing system.

FIG. 5 schematically shows a non-limiting embodiment of a computing system 500 that can enact one or more of the methods and processes described above. Computing system 500 is shown in simplified form. One or more aspects of computing system 500 may be utilized in stylus 100 and in the computing device 104 described herein. Computing system 500 may take the form of one or more input devices, personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502, volatile memory 504, and a non-volatile storage device 506. Computing system 500 may optionally include a display subsystem 508, input subsystem 510, communication subsystem 512, and/or other components not shown in FIG. 5.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built-in. Non-volatile storage device 506 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a stylus, keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless personal-, local-, or wide-area network, such as Bluetooth or an HDMI over Wi-Fi connection. In some embodiments, the communication subsystem may allow computing system 500 to send and/or receive messages to and/or from other devices via a network such as the Internet.

The following paragraphs provide additional support for the claims of the subject application. One aspect provides, in a stylus for use with a display screen of a computing device, a method for arming and managing power consumption of a haptic feedback component in the stylus, the method comprising, prior to actuating the haptic feedback component to produce haptic output: at least on condition of detecting a first user interaction with the stylus, transmitting power for at least a first time period to a haptic circuit communicatively coupled to the haptic feedback component; at least on condition of determining that the first time period expires, determining if a second user interaction with the stylus is detected; if the second user interaction with the stylus is detected, then continuing to transmit power to the haptic circuit; and if the second user interaction with the stylus is not detected, then ceasing to transmit power to the haptic circuit. The method may additionally or alternative include, wherein transmitting power to the haptic circuit comprises executing a haptic driver without actuating the haptic feedback component. The method may additionally or alternative include, wherein transmitting power to the haptic circuit comprises executing a haptic driver that causes the haptic feedback component to vibrate at a user-imperceptible magnitude.

The method may additionally or alternative include, wherein the first user interaction with the stylus comprises either (1) the stylus contacting the display screen of the computing device, or (2) the stylus positioned within a predetermined hover distance of the computing device. The method may additionally or alternative include, wherein the second user interaction with the stylus comprises (1) the stylus receiving an electrostatic energy signal from the computing device, (2) a button actuated on the stylus, or (3) at least one user finger detected on the stylus in an inking position that is associated with contacting the display screen of the computing device. The method may additionally or alternative include, on condition of determining that the first time period expires, determining if both a third user interaction with the stylus and a fourth user interaction with the stylus are detected; if the third user interaction and the fourth user interaction with the stylus are detected, then continuing to transmit power to the haptic circuit; and if either the third user interaction or the fourth user interaction with the stylus is not detected, then ceasing to transmit power to the haptic circuit.

The method may additionally or alternative include, wherein the third user interaction with the stylus comprises the stylus moving to generate an accelerometer output that exceeds a predetermined acceleration threshold, and the fourth user interaction with the stylus comprises detecting a user holding the stylus. The method may additionally or alternative include, on condition of determining that the first time period expires, determining if both the accelerometer output exceeding the predetermined acceleration threshold and a fifth user interaction with the stylus are detected; if the accelerometer output exceeding the predetermined acceleration threshold and the fifth user interaction with the stylus are detected, then continuing to transmit power to the haptic circuit; and if either the accelerometer output is not exceeding the predetermined acceleration threshold or the fifth user interaction with the stylus is not detected, then ceasing to transmit power to the haptic circuit. The method may additionally or alternative include, wherein the fifth user interaction with the stylus comprises detecting a body stress on a body of the stylus that exceeds a predetermined body stress.

The method may additionally or alternative include, during the first time period receiving an additional user interaction with the stylus; and on condition of receiving the additional user interaction with the stylus during the first time period, extending the first time period by an extension time. The method may additionally or alternative include, during the first time period receiving an additional user interaction with the stylus when a remaining time in the first time period is less than an extension time; and on condition of receiving the additional user interaction with the stylus during the first time period when the remaining time is less than the extension time, resetting the first time period to the extension time.

Another aspect provides, in a stylus for use with a display screen of a computing device, a method for arming and managing power consumption of a haptic feedback component in the stylus, the method comprising, prior to actuating the haptic feedback component to produce haptic output: transmitting power to a haptic circuit communicatively coupled to the haptic feedback component; determining a first haptic predictor value corresponding to a first user interaction with the stylus; generating a weighted first haptic predictor value by weighting the first haptic predictor value; determining a second haptic predictor value corresponding to a second user interaction with the stylus; generating a weighted second haptic predicter value by weighting the second haptic predicter value; combining at least the weighted first haptic predicter value and the weighted second haptic predicter value to generate a combined weighted predictive result; comparing the combined weighted predictive result to a haptic predictive threshold value; on condition that comparing the combined weighted predictive result to the haptic predicter threshold value yields a haptic predictive result, continuing to transmit power to the haptic circuit; and on condition that comparing the combined weighted predictive result to the haptic predicter threshold value yields a non-haptic-predictive result, ceasing to transmit power to the haptic circuit. The method may additionally or alternative include, wherein transmitting power to the haptic circuit communicatively coupled to the haptic feedback component comprises providing power to the haptic circuit without actuating the haptic feedback component.

The method may additionally or alternative include, wherein transmitting power to the haptic circuit communicatively coupled to the haptic feedback component comprises actuating the haptic feedback component to vibrate at a user-imperceptible magnitude. The method may additionally or alternative include, determining a third haptic predicter value corresponding to a third user interaction with the stylus; generating a weighted third haptic predicter value by weighting the third haptic predicter value by a third factor; and combining at least the weighted first haptic predicter value, the weighted second haptic predicter value, and the weighted third haptic predicter value to generate the combined weighted predictive result. The method may additionally or alternative include, determining one or more additional haptic predicter values corresponding to one or more additional user interactions with the stylus; generating one or more weighted additional haptic predicter values by weighting the one or more additional haptic predicter values by one or more additional factors; and combining at least the weighted first haptic predicter value, the weighted second haptic predicter value, the weighted third haptic predicter value, and the one or more weighted additional haptic predicter values to generate the combined weighted predictive result.

The method may additionally or alternative include, wherein the first haptic predicter value is either (1) an inking value and the corresponding first user interaction with the stylus comprises the stylus contacting the display screen of the computing device, or (2) a hover value and the corresponding first user interaction with the stylus comprises the stylus positioned within a predetermined hover distance of the computing device. The method may additionally or alternative include, wherein the first haptic predicter value is the inking value, and weighting the inking value comprises applying a temporal decay function that decreases the weighted first haptic predicter value over time. The method may additionally or alternative include, wherein the second haptic predicter value is either (1) an uplink value and the corresponding second user interaction with the stylus comprises the stylus receiving an electrostatic energy signal from the computing device, or (2) a button click value and the corresponding first user interaction with the stylus comprises a button actuated on the stylus.

Another aspect provides a stylus for use with a display screen of a computing device, the stylus comprising: a body; a haptic feedback component within the body; a logic processor; and a memory storing instructions executable by the processor to arm and manage power consumption of the haptic feedback component in the body, the instructions executable to, prior to actuating the haptic feedback component to produce haptic output: at least on condition of detecting a first user interaction with the stylus, transmitting power for at least a first time period to a haptic circuit communicatively coupled to the haptic feedback component; at least on condition of determining that the first time period expires, determining if a second user interaction with the stylus is detected; if the second user interaction with the stylus is detected, then continuing to transmit power to the haptic circuit; and if the second user interaction with the stylus is not detected, then ceasing to transmit power to the haptic circuit.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. In a stylus for use with a display screen of a computing device, a method for arming and managing power consumption of a haptic feedback component in the stylus, the method comprising, prior to actuating the haptic feedback component to produce haptic output:
   at least on condition of detecting a first user interaction with the stylus, transmitting power for at least a first time period to a haptic circuit communicatively coupled to the haptic feedback component, wherein transmitting power for at least the first time period to the haptic circuit comprises executing a haptic driver that causes the haptic feedback component to vibrate at a user-imperceptible magnitude for at least the first time period;
   at least on condition of determining that the first time period expires, determining if a second user interaction with the stylus is detected;
   if the second user interaction with the stylus is detected, then continuing to transmit power to the haptic circuit to cause the haptic feedback component to vibrate at the user-imperceptible magnitude; and
   if the second user interaction with the stylus is not detected, then ceasing to transmit power to the haptic circuit.

2. The method of claim 1, wherein transmitting power to the haptic circuit comprises executing the haptic driver without actuating the haptic feedback component.

3. The method of claim 1, wherein the first user interaction with the stylus comprises either (1) the stylus contacting the display screen of the computing device, or (2) the stylus positioned within a predetermined hover distance of the computing device.

4. The method of claim 3, wherein the second user interaction with the stylus comprises (1) the stylus receiving an electrostatic energy signal from the computing device, (2) a button actuated on the stylus, or (3) at least one user finger detected on the stylus in an inking position that is associated with contacting the display screen of the computing device.

5. The method of claim 1, further comprising, on condition of determining that the first time period expires, determining if both a third user interaction with the stylus and a fourth user interaction with the stylus are detected;
    if the third user interaction and the fourth user interaction with the stylus are detected, then continuing to transmit power to the haptic circuit; and
    if either the third user interaction or the fourth user interaction with the stylus is not detected, then ceasing to transmit power to the haptic circuit.

6. The method of claim 5, wherein the third user interaction with the stylus comprises the stylus moving to generate an accelerometer output that exceeds a predetermined acceleration threshold, and the fourth user interaction with the stylus comprises detecting a user holding the stylus.

7. The method of claim 6, further comprising, on condition of determining that the first time period expires, determining if both the accelerometer output exceeding the predetermined acceleration threshold and a fifth user interaction with the stylus are detected;
    if the accelerometer output exceeding the predetermined acceleration threshold and the fifth user interaction with the stylus are detected, then continuing to transmit power to the haptic circuit; and
    if either the accelerometer output is not exceeding the predetermined acceleration threshold or the fifth user interaction with the stylus is not detected, then ceasing to transmit power to the haptic circuit.

8. The method of claim 7, wherein the fifth user interaction with the stylus comprises detecting a body stress on a body of the stylus that exceeds a predetermined body stress.

9. The method of claim 1, further comprising:
    during the first time period receiving an additional user interaction with the stylus; and
    on condition of receiving the additional user interaction with the stylus during the first time period, extending the first time period by an extension time.

10. The method of claim 1, further comprising:
    during the first time period receiving an additional user interaction with the stylus when a remaining time in the first time period is less than an extension time; and
    on condition of receiving the additional user interaction with the stylus during the first time period when the remaining time is less than the extension time, resetting the first time period to the extension time.

11. A stylus for use with a display screen of a computing device, the stylus comprising:
    a body;
    a haptic feedback component within the body;
    a logic processor; and
    a memory storing instructions executable by the processor to arm and manage power consumption of the haptic feedback component in the body, the instructions executable to, prior to actuating the haptic feedback component to produce haptic output:
        at least on condition of detecting a first user interaction with the stylus, transmitting power for at least a first time period to a haptic circuit communicatively coupled to the haptic feedback component, wherein transmitting power for at least the first time period to the haptic circuit comprises executing a haptic driver that causes the haptic feedback component to vibrate at a user-imperceptible magnitude for at least the first time period;
        at least on condition of determining that the first time period expires, determining if a second user interaction with the stylus is detected;
        if the second user interaction with the stylus is detected, then continuing to transmit power to the haptic circuit to cause the haptic feedback component to vibrate at the user-imperceptible magnitude; and
        if the second user interaction with the stylus is not detected, then ceasing to transmit power to the haptic circuit.

* * * * *